US005598242A

United States Patent [19]
Omi et al.

[11] Patent Number: 5,598,242
[45] Date of Patent: Jan. 28, 1997

[54] VIBRATION COMPENSATION MODE SELECTION APPARATAUS AND ASSOCIATED VISUAL DISPLAY FOR A CAMERA

[75] Inventors: Junichi Omi, Kawasaki; Hiroshi Wakabayashi, Yokohama; Hidenori Miyamoto, Urayasu; Isao Soshi, Tokyo; Minoru Kato, Kawasaki; Tatsuo Amanuma, Ageo; Yoshio Imura, Kawasaki, all of Japan

[73] Assignee: Nikon Corporation, Tokyo, Japan

[21] Appl. No.: 356,063

[22] Filed: Dec. 4, 1994

[30]   Foreign Application Priority Data

Dec. 14, 1993  [JP]  Japan ..................... 5-313715
Feb. 3, 1994   [JP]  Japan ..................... 6-011878
Feb. 4, 1994   [JP]  Japan ..................... 6-032052
Feb. 4, 1994   [JP]  Japan ..................... 6-033112

[51] Int. Cl.$^6$ ............................ G03B 5/00; G03B 13/00; G03B 17/40
[52] U.S. Cl. ............................................. 396/55; 396/281
[58] Field of Search ........................... 354/70, 202, 400, 354/430, 219, 289.1, 195.1, 195.12, 199; 348/208

[56]            References Cited

U.S. PATENT DOCUMENTS 5,012,270   4/1991  Sekine et al. ..................... 354/430
5,266,981  11/1993  Hamada et al. ................... 354/400
5,337,098   8/1994  Imafuji et al. .................... 354/70

FOREIGN PATENT DOCUMENTS 3-237411   6/1991   Japan .

Primary Examiner—A. A. Mathews

[57]            ABSTRACT

A vibration compensation mode selection apparatus and associated visual display for a camera which allows a photographer to enable or disable a vibration compensation unit while receiving visual feedback regarding the operation state of the vibration compensation unit and information regarding the vibrations detected within the camera. A vibration detection unit is provided to output a signal indicating the amount and direction of vibrations experienced by the camera. A vibration compensation unit drives the vibration compensation lens perpendicular to the optical axis of a photographic lens system to correct for the vibrations detected by the vibration detection unit. A button is provided on the front face of the camera to enable the photographer to disable the vibration compensation unit by pressing the button. A display unit is provided to indicate to the photographer whether the vibration compensation system has been enabled or disabled. For example, the display unit can be configured to flash at a high frequency when the vibration compensation unit has been disabled. Further, the display unit can be configured to provide information regarding the severity of the vibrations detected within the camera. Specifically, the display unit can be configured to steadily illuminate to indicate vibrations which can be corrected by the vibration compensation system, and at a slow rate to indicate vibrations which are outside the correctable range of the vibration compensation unit. The display unit can either be provided within the viewfinder or on the body of the camera in a location easily visible by the photographer.

44 Claims, 16 Drawing Sheets

VIBRATION COMPENSATION MODE SELECTION APPARATAUS AND ASSOCIATED VISUAL DISPLAY FOR A CAMERA

BACKGROUND OF THE INVENTION

1. Field of the Invention

The present invention is related to a vibration compensation system that corrects image blur caused by vibration of an optical element, and in particular, the present invention is related to a mode selection mechanism to activate and deactivate a vibration compensation device and an associated warning display that indicates the potential for image blur and the operational state, i.e. the mode, of the vibration compensation system.

2. Description of the Related Art

There is a recent trend toward automating cameras with electronic components, for example AE (automatic exposure) systems, AF (auto focus) systems, and vibration compensation systems. Vibration compensation systems may be provided with vibration detection circuitry that detects the amount of potential image blur by analyzing the size of the amount of vibration. Thereafter, such vibration compensation systems make a determination as to whether an acceptable photograph can be produced and drive a vibration compensation optical system to correct for any detected vibrations. However, such a determination is not always correct nor is vibration compensation always desired. For example, vibration compensation is detrimental when the photographer is trying to achieve a special effect by vibrating the camera or when photography is conducted while the photographer and the subject are experiencing the same vibrations, e.g. photographing a subject while on a train with the subject. Therefore, a user operable switch to enable and disable vibration compensation is desirable. It is also desirable to provide visual indications of the operating state or mode of the vibration compensation system, along with information related to the magnitude of vibrations, to enable the photographer to make an informed decision.

It has been generally suggested to display a warning when the amount of vibration, as detected by the vibration detection circuitry, exceed a preset value. Further, displays have been suggested which display a warning when the vibration compensation system is not operating. However, providing two individual displays would complicate the understanding and operation of a camera. These suggestions have also failed to provided any indication of a preferred location for the displays or any details as to operation, for example, no displays have been suggested which operate during exposure. Currently, no single display is known which indicates whether vibration compensation is needed, and whether the vibration compensation system has been enabled.

It is known to equip camcorders with a switch to change the vibration compensation operation state. This switch is typically a status switch, that switches between a disabled state and an enabled state, and is physically located on the camcorder in an area other than the holding area. This is disadvantageous in that using a remote located status switch, the photographer may forget and leave the switch either on or off. Thus, the vibration compensation system may be disabled when such compensation is actually desired, for example when holding the camera with one hand. Currently, no such switch has been provided on a photographic camera.

SUMMARY OF THE INVENTION

Accordingly, it is an object of the present invention to provide a camera with a vibration compensation function by which the photographer can immediately and appropriately discriminate and understand the current vibration conditions and the vibration compensation operational state, i.e. the mode, and can thereby execute photography under the required conditions.

It is another object of the invention to provide a combined vibration warning display and a vibration compensation operation state display in one physical warning display for a camera, in the view finder, either in the picture field within the view finder or in the surrounding parts of the view finder.

It is a further object of the present invention to provide a warning display for a camera comprising, for example, an LED or a lamp, that emits visible light, easy for a photographer to see.

It is yet a further object of the invention to provide a visual display for a camera indicating content by differences of frequency, for example, flashing with a large frequency and flashing with a small frequency, whereby the same member can indicate two or more events or states, for example, a vibration warning and an indication of a vibration compensation operation state.

It is another object of the invention to provide a vibration compensation system capable of suppressing camera vibration even when the vibration compensation system is in a disabled state.

It is yet another object of the invention to provide a camera that can disable the vibration compensation system when the photographer does not wish to compensate for vibration.

It is a further object of the invention to provide a camera wherein vibration compensation is disabled in response to a signal, such that the vibration compensation system can be disabled when vibration compensation is not desired.

It is another object of the invention to provide a vibration compensation system that can reliably prevent image blur in a camera having a vibration compensation enabled state and a vibration compensation disabled state which are automatically selected even when the photographer is mistaken about the photographic conditions, or when the photographer forgets to switch to the vibration compensation enabled state.

It is another object of the invention to provide a circuit for an image producing apparatus which determines whether photographic conditions exceed a permissible value such that an unacceptable amount of blur would occur in a photographic image, and, if such a condition exists, activating a vibration compensation unit during photography even if the vibration compensation system is in a disabled state.

It is another object of the invention to provide a circuit for an image producing apparatus which determines that photographic conditions would produce an unacceptable amount of blur in a photographic image if the preset shutter time is longer than a specified time.

It is another object of the invention to provide a method for producing an image in which the user can select whether to compensate for vibrations.

Additional objects and advantages of the invention will be set forth in part in the description which follows, and, in part, will be obvious from the description, or may be learned by practice of the invention.

Objects of the present invention are achieved in an image producing apparatus comprising a vibration detection unit to detect vibrations in the image producing apparatus, a vibration compensation unit to correct for the effects of the vibrations detected by the vibration detection unit on the image, and a mode selection unit to selectively disable the vibration compensation unit in response to input from a user of the image producing apparatus.

Objects of the present invention are further achieved by a camera for producing an image comprising a vibration detection unit to detect vibrations in the camera, a vibration compensation unit to correct for the effects of the vibrations detected by the vibration detection unit on the image, a mode selection unit to selectively disable the vibration compensation unit in response to input from a user of the camera, and a display unit to indicate to, a user that the vibration detection unit has been disabled.

Objects of the present invention are further achieved by a method of producing an image with an image producing apparatus comprising determining whether a user desires to compensate for vibrations when producing the image, detecting vibrations in the image producing apparatus, producing the image with the image producing apparatus, and compensating for the detected vibration during the step of producing the image when it was determined that the user desired to compensate for vibrations.

Objects of the present invention are also achieved by a camera comprising a vibration detection signal generator, a vibration compensation device which corrects vibration based on the vibration detection signal, a termination signal generator which terminates the vibration compensation operation of the vibration compensation system, and a warning display to display warnings using, for example, visually emitted light and flashing signals based on the termination signals, the warning display provided in a location that the photographer can see when peering into the finder or the surrounding parts.

Objects of the present invention are also achieved by a camera with a warning display that is configured to light up when there are small vibrations, to generate a first flashing display when there are large vibrations, and to generate a second flashing display that has a different flashing frequency than the first flashing display when a termination signal is detected.

Objects of the present invention are also achieved by a camera comprising a shutter release button for releasing a shutter, camera vibration detector that detects the amount of camera vibration, a camera vibration compensation system that corrects camera vibration, and a camera vibration compensation termination button which terminates the operation of the camera vibration compensation system positioned on the opposite side of a photographic lens from the shutter release button.

Objects of the present invention are also achieved by a camera comprising a vibration compensation system to compensate for vibration during photography, a vibration compensation prohibition signal generator, and a control device to control the operation of vibration compensation system.

Objects of the present invention are also achieved by a camera comprising a vibration detector which detects an amount of camera vibration, a vibration compensation system, for preventing blur in a photographic image, which drives a vibration compensation optical system in a direction that differs from the optical axis based on the detection output of the vibration detector, a selection device that selects between a vibration compensation photographic mode and an ordinary photographic mode, and a control unit which conducts photography without activating the vibration compensation system when the ordinary photographic mode is selected, and which conducts photography by activating the vibration compensation system when the vibration compensation photographic mode is selected.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
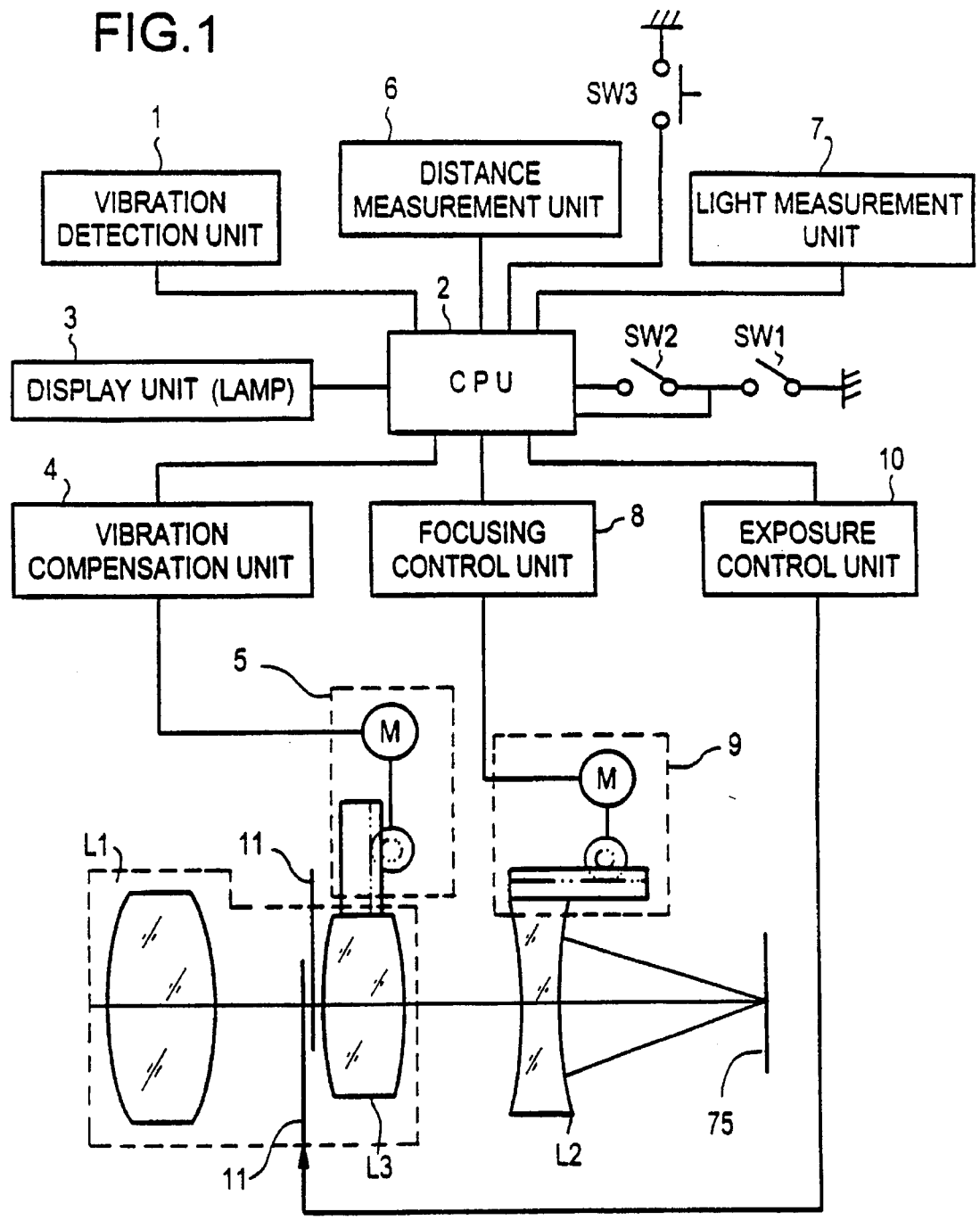
FIG. 1 is a block diagram of a camera in accordance with the first preferred embodiment of the present invention.

Reference will now be made in detail to the present preferred embodiments of the present invention, examples of which are illustrated in the accompanying drawings, wherein like reference numerals refer to like elements throughout.

FIG. 1 is a block diagram of a control system for a camera equipped with a vibration compensation system in accordance with a first preferred embodiment of the present invention. A vibration detection unit 1 detects vibrations produced in the camera by, for example, hand vibrations. The vibration detection unit is activated by a CPU 2 in response to a switch SW1 which is activated by the half press of a shutter release button (not shown).

A display unit 3 comprising, for example, a green lamp, or an LED, is situated on the rear of the camera near the viewfinder (not shown). The CPU 2 causes the display unit 3 to flash or to steadily light in response to the activation of the vibration detection unit 1 and the signals produced by the vibration detection unit 1. Specifically, when the switch SW1 goes ON, by pressing the shutter release button half way down, the vibration detection unit 1 is activated and the CPU 1 causes the display unit 3 to flash. After a specified time has elapsed, corresponding to the output from the vibration detection unit 1, the CPU 2 causes the warning display unit 3 to be steadily illuminated if the amount of vibration of the camera is smaller than a specified amount. Therefore, the photographer can determine the advisability of taking the photograph.

A vibration compensation unit 4, activated by the CPU 2 when a switch SW2 goes ON, via the full press of the shutter button, corrects for vibrations based on the output of the vibration detection unit 1. The vibration compensation unit 4 causes a drive system 5 to move a vibration compensation lens L3, which is one part of photographic optical system L1, in a direction perpendicular to the optical axis to correct image blur of the subject image on a film plane 75. A switch SW3, connected the CPU 2, causes the vibration compensation unit 4 to cease operation when activated.

A known distance measurement unit 6 and a known light measurement unit 7 are connected to the CPU 2 and activated when the switch SW1 goes ON. A focusing control unit 8, connected to the CPU 2, automatically drives a focusing optical system L2, via a focusing drive unit 9, to achieve a focused state corresponding to the output signal of the distance measurement unit 6. An exposure control unit 10, also connected to the CPU 2, drives an aperture 11 in accordance with the output of the light measurement unit 7.

Figure 2:
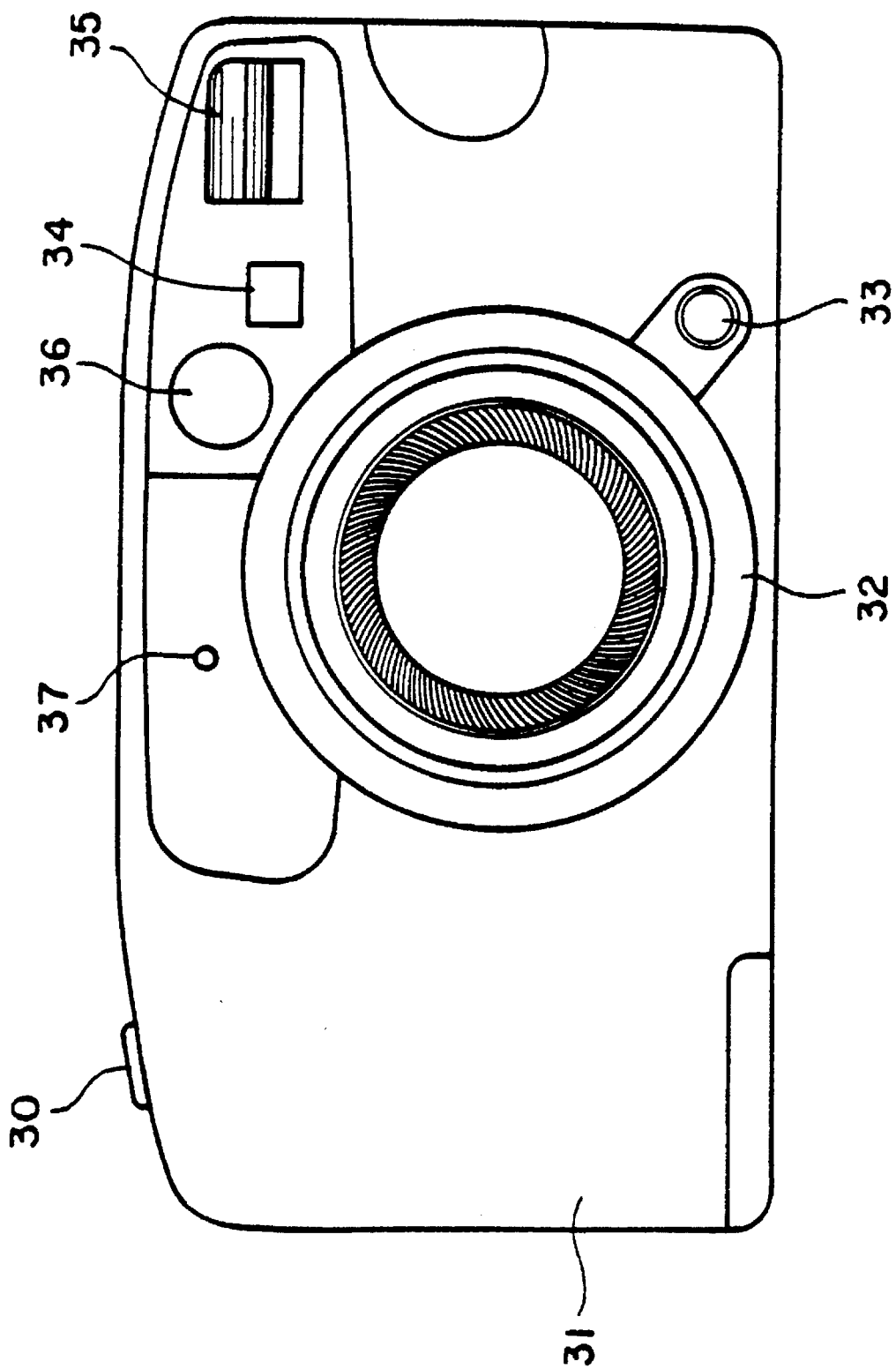
FIG. 2 is a front view of a camera in accordance with a first preferred embodiment of the present invention.

FIG. 2 is a diagram of a compact camera 31 with a lens barrel 32 which holds the photographic optical system (L1–L3). A vibration compensation termination button 33, which activates the switch SW3, is provided diagonally on the lower side of the lens barrel 32 opposite a shutter release button 30. In addition, the front surface of the camera 31, is provided with a viewfinder 34, a strobe 35, a light emitting/receiving device 36, used by the focusing control unit 8, and a distance measurement window 37. The shutter release button 30 is provided to operate the switch SW1 (on half press) and the switch SW2 (on full press).

According to this configuration, the photographer can quickly and appropriately discriminate and understand the vibration conditions and the operative state of the vibration compensation system. This understanding allows the photographer to produce acceptable photographs, in particular, because a vibration warning and a vibration compensation system disabled warning are jointly displayed by the display unit 3, within the visual field of the viewfinder 34, the photographer can easily take photographs while reliably understanding the vibration conditions and the operative state of the vibration compensation unit 4 while viewing the scene through the view finder 34. This configuration has the further advantage of reducing costs associated with providing individual vibration warnings and vibration compensation termination warnings.

The display unit 3 is configured to steadily light when small vibrations are detected, to be flashing in a first flashing display state when large vibrations are present, and to be flashing in a second flashing display state having a differing flash frequency than the first flashing display state, for example, a higher frequency, when the vibration compensation unit 4 has been disabled by the vibration compensation termination button 33. The warning about the vibration compensation termination status is given precedence over the vibration warning so it can be easily and reliably discriminated and understood.

Figure 3:
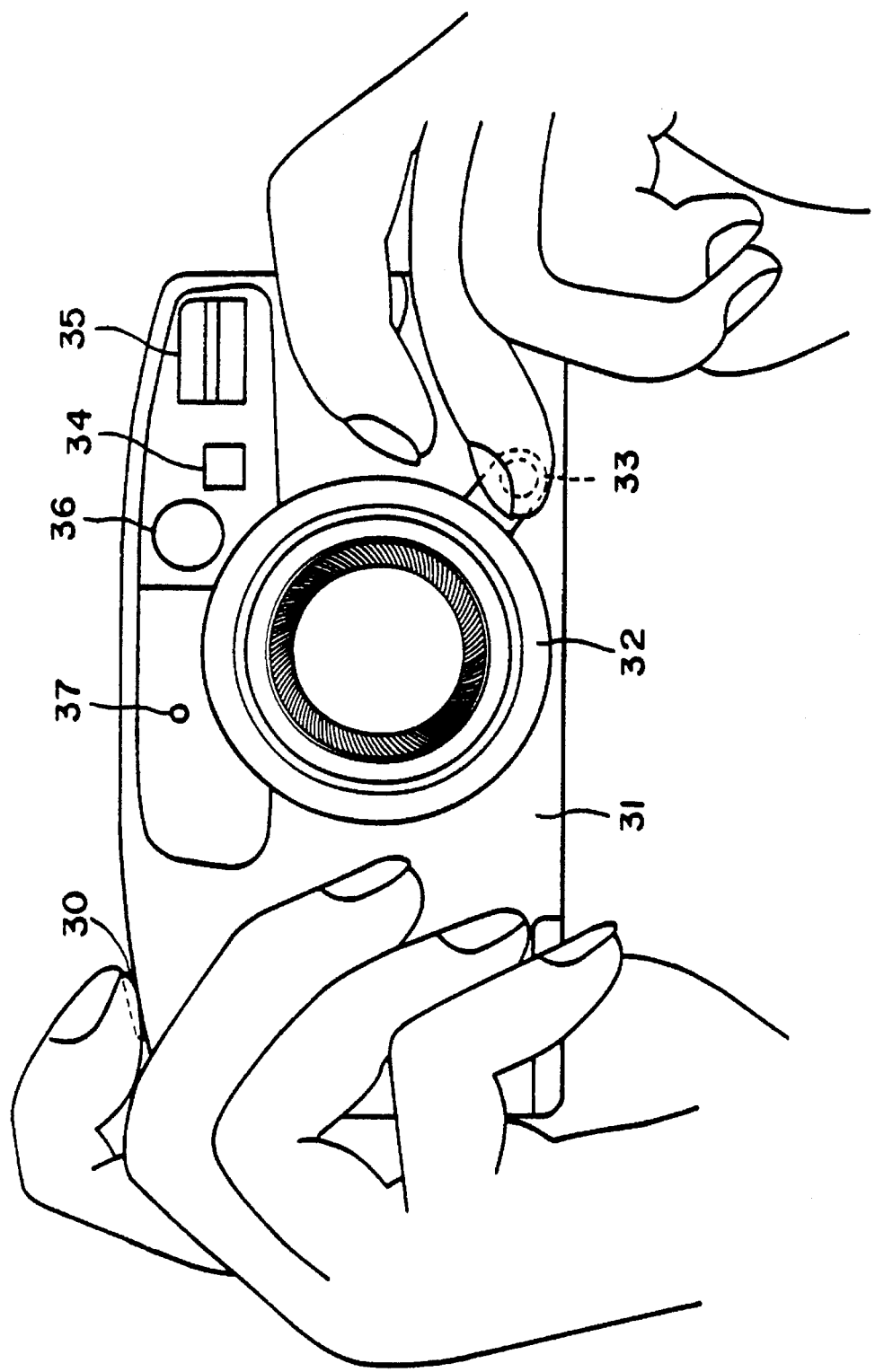
FIG. 3 is a front view of a camera in accordance with a first preferred embodiment of the present invention showing the position of a user's hands during photography.

FIG. 3 is a diagram showing a photographer holding the camera body 31 so as to be able to turn on vibration compensation termination button 33, which operates the vibration compensation termination button SW3 to control the operating state of the vibration compensation unit 4. As shown, the vibration compensation termination button 33 is positioned near the photographic lens barrel 32 and opposite the shutter release button 30 such that the camera body 31 must be held with both hands, thereby assisting in suppressing vibrations, even when the vibration compensation unit 4 is disabled by pressing the vibration compensation termination button 33.

Figure 4:
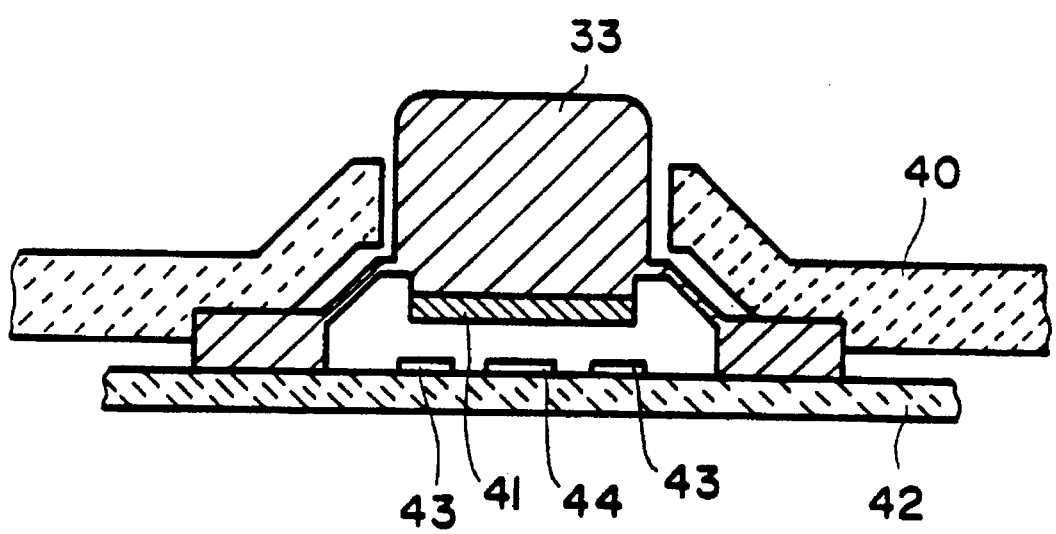
FIG. 4 is a side cut away view of a switch for disabling the vibration compensation unit in accordance with a first preferred embodiment of the present invention.

FIG. 4 is a diagram showing the structure of the vibration compensation termination button 33. A conductive rubber strip 41 is attached to the vibration compensation termination button 33 inside a cover 40 attached to the camera body 31. The conductive rubber strip 41 selectively shorts a pair of conductive parts 43 and 44 on a printed routing substrate 42. Thus, by pressing the vibration compensation termination button 33 the state of switch SW3 can be changed from OFF to ON which puts the vibration compensation unit 4 in the vibration compensation disabled state. As long as the vibration compensation termination button 33 is held down the switch SW3 stays in the ON state.

Figure 5:
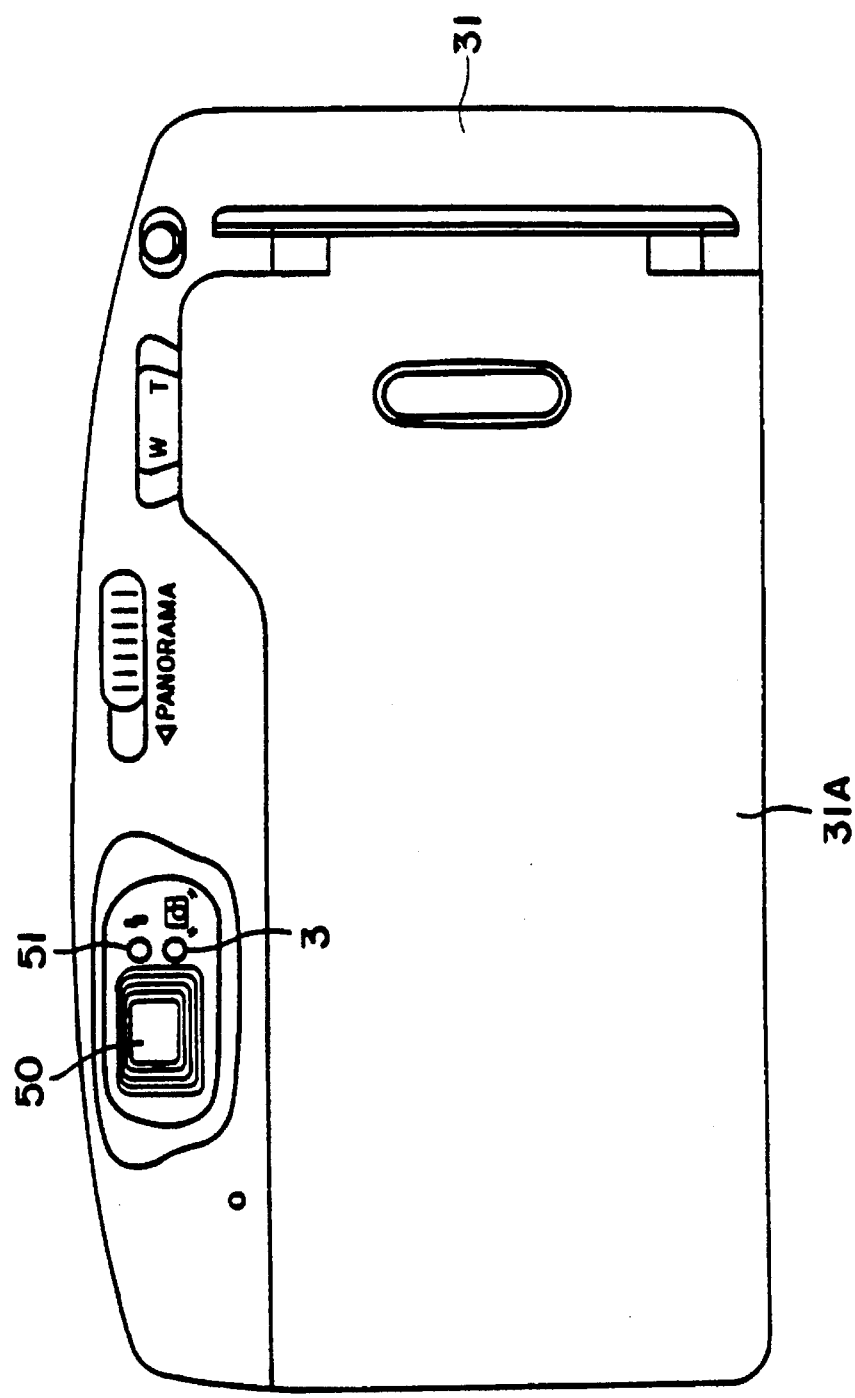
FIG. 5 is a rear view of a camera in accordance with a first preferred embodiment of the present invention.

FIG. 5 is a rear view of the camera body 31. As shown in FIG. 5, the display unit 3 is situated on a peripheral part of a finder eyepiece 50 along with a flash ready indicator 51. A back door 31A is provided for access to a film chamber.

Figure 6:
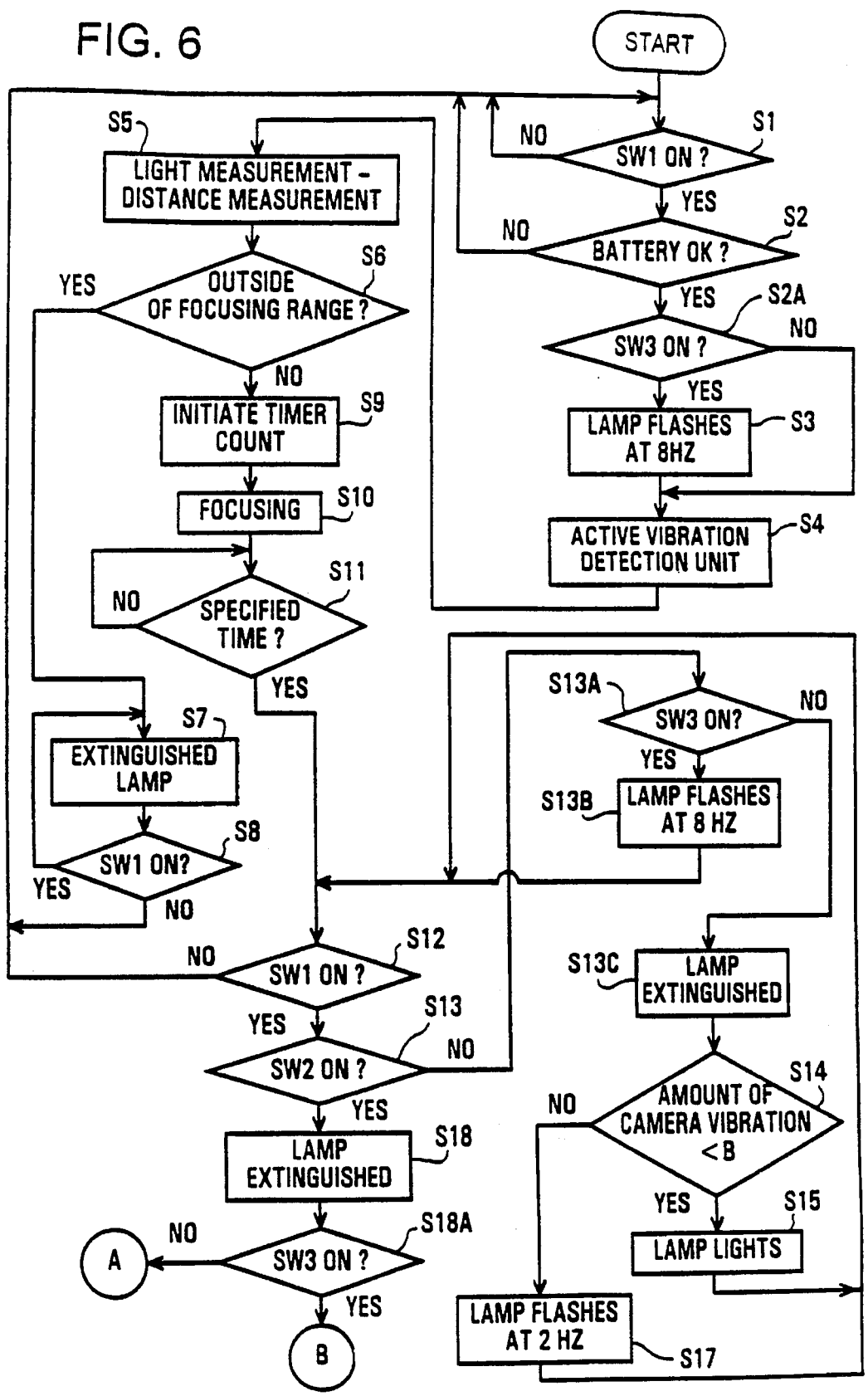
FIG. 6 is a flow chart showing the operation of the camera in accordance with the first preferred embodiment of the present invention.
Figure 7:
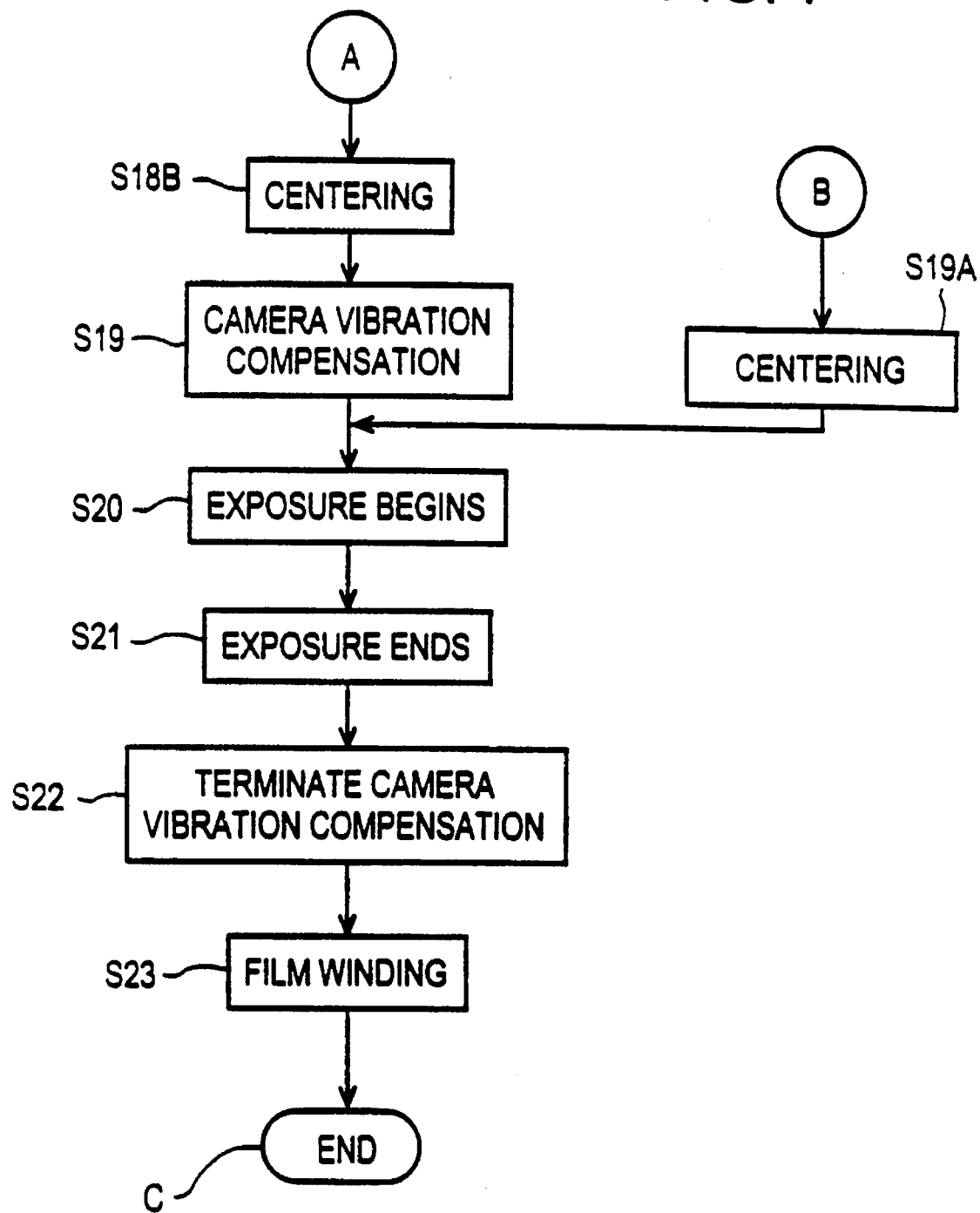
FIG. 7 is a continuation of the flow chart in FIG. 6 showing the operation of the camera in accordance with the first preferred embodiment of the present invention.

FIGS. 6 and 7 are flow charts showing the operation of the CPU 2.

Operation is started when the main power source switch (not shown) of the camera body is turned ON. In Step S1 the switch SW1 is checked to determine if it is ON. When the shutter release button 30 is pressed half way, the switch SW1 goes ON and the operation proceeds from step S1 to step S2. In step S3 the battery (not shown) is checked to determine whether the charge is sufficient. If the battery is adequately charged, the operation advances to step 2A, and it is determined whether the switch SW3 is ON or OFF. If the switch SW3 is ON, i.e. the vibration compensation termination button 33 is being pressed, the operation advances to S3, and the CPU 2 causes the display part 3 to flash at 8 Hz, in a first state. If in step S2A the switch SW3 is OFF, the operation advances directly to step S4. In step S4, the CPU 2 activates vibration detection unit 1. In step S5, the CPU 2 activates the light measurement unit 7, and the distance measurement unit 6 to conduct light measurement and distance measurement, respectively.

Next, in step S6, the CPU 2 determines whether the distance measurement results from step S5 are outside of a preset focusing range. If the distance measuring results are outside of the focusing range, achieving focus is not possible and the display unit 3 is extinguished in step S7. Thereafter, in step S8 operation is halted until the switch SW1 is turned OFF, after which operation is restarted.

If focus can be achieved, the operation advances to step S9, a timer count is started, and the operation proceeds to step S10 where the CPU 2 commands the focusing control unit 8 to automatically focus the lens L2 via the drive system 9.

In step S11, the CPU 2 checks whether the timer count has reached a specified value, and if it has not, awaits until the specified value is reached. Once the specified value has been reached, the operation advances to step S12 and the CPU 2 checks whether the switch SW1 is ON. If switch SW1 is OFF, the operation returns to step S1.

If the switch SW1 is ON, the switch SW2 is checked in step S13. If the switch SW2 is OFF, operation advances to step S13A and the CPU 2 determines whether the switch SW3 has been turned ON. If the switch SW3 is ON, the display unit 3 continues flashing at 8 Hz in step 13B, and operation returns to S12. If in step S13A the switch SW3 is OFF, the display unit 3 is extinguished in step S13C. In step S14, it is detected whether the amount of vibration is smaller than a specified amount "B". If the detected amount of vibration is smaller than the specified amount B, the operation advances to step S15 and the CPU 2 causes the display unit 3 to light steadily. Thereafter, operation returns to step S12.

If the detected amount of vibration is greater than the specified amount B in step S14, operation advances to step 17 and the CPU 2 causes the display part 3 to flash at 2 Hz indicating large vibrations. Thereafter, operation returns to step S12.

When the photographer confirms that the display part 3 is steadily illuminated, and fully presses the shutter release button 30, operation advances from step S13 to step S18 and the CPU 2 extinguishes the display part 3. Thereafter in step S18A it is determined whether the switch SW3 is ON.

If in step S18A the switch SW3 is ON, the operation advances to step S19A (FIG. 7), and the vibration compensation optical system L3 is centered on the optical axis of the photographic lens. Thereafter, exposure is initiated in step S20, completed in step S21 and the film is wound in step S23.

If the switch SW3 is OFF in step S18A, operation advances to S18B and the vibration compensation optical system L3 is centered. Thereafter in step S19 the CPU 2 commands the vibration compensation unit 4 to correct for vibrations corresponding to the detected amount of vibration obtained in S4.

Specifically, in step S19, the vibration compensation optical system L3 is shifted and controlled by the vibration compensation unit 4, via the drive system 5, to compensate for vibrations. After vibration correction is initiated, the operation proceeds to step S20. In step S20 the CPU 2 operates the exposure control unit 10 to control the aperture corresponding to the output of the light measurement unit 7.

The exposure control unit 10 drives the aperture 11 and the photograph is taken. In step S21, the CPU 2 signals the exposure control unit 10 to complete exposure. Thereafter in step S22 the CPU 2 signals the vibration compensation unit 4 to terminate vibration compensation. Then in step S23, the CPU 2 causes the film winding mechanism (not shown) to wind the film one frame. Afterwards, the CPU 2 completes its operations in step C.

Although the first embodiment of the present invention has been described with respect to a specific configuration, it will be recognized that the first embodiment is not limited to the specific configuration. For example, the switch SW2 may be omitted, and the switch SW1 is made to go ON by a full push of the shutter release button 30. Thereafter, the CPU 2 operates as it did in the first preferred embodiment from step S3 to step S12. If the full push continues, the CPU 2 detects vibrations, and if the vibrations are smaller than the specified amount B, the display part 3 is lit for several seconds, and when the display part 3 is extinguished the CPU 2 operates in the same way as it did from step S19. Thus, the photographer can determine that vibration compensation is possible and can conduct photography if the display unit 3 switch between flashing and being lit for several seconds.

The display unit 3 may be a green lamp provided in the finder or in the part surrounding it, or it may be a lamp or LED display that is provided on the back surface of the camera body, or one that is positioned in the visual field of the photographer near the viewfinder window. Although the display unit 3 was described as comprising a lamp it is not limited to this, and for example, the words "wait to photograph" may be displayed to indicate the first state, and the words "photography okay" may be displayed to indicate the second state. The display unit 3 can also be configured to display further information, for example, exposure conditions.

Moreover, the vibration compensation termination button 33 may be provided at locations other than the side of lens barrel 32. The operation of the vibration compensation termination button 33 may also be reversed, i.e. enter the OFF state when pressed.

According to the first preferred embodiment of the present invention a camera is equipped with a vibration compensation unit 4, a vibration detection unit 1, a vibration compensation termination button 33 which terminates the operation of the vibration compensation unit 4, and a display unit 3 that displays a warning using, for example, visually emitted light and flashing signals, based on the state of the vibration compensation termination switch. The display part is provided in a location that can be easily seen by the user, i.e. the photographer. Therefore, the user can immediately and suitably discriminate the vibration conditions and the operational state of the vibration compensation unit.

According to the first preferred embodiment, the vibration warning display and the vibration compensation termination warning can be jointly issued by the display unit 3, using a lamp or an LED, positioned in the visual field of the user preferably within or in the vicinity of the view finder, such that it can be visually observed while the photographer peers into the view finder.

Moreover, because the display unit 3 is configured to be steadily lit display when there is a small amount of vibration, to be in a first flashing display state when there is a large amount of vibration, and to be in a second flashing display state when the vibration compensation system is disabled, the content of multiple warnings can be displayed by a single member and still be easily discriminated by the photographer.

Further, because the camera must be held with two hands, blurring in photographs is reduced even if the vibration compensation unit 4 is in a disabled state. Also, because the switch SW3 is a self-return switch, the vibration compensation unit is automatically enabled when the switch SW3 is released, thus the user cannot forget to enable the vibration compensation unit 4.

Figure 8:
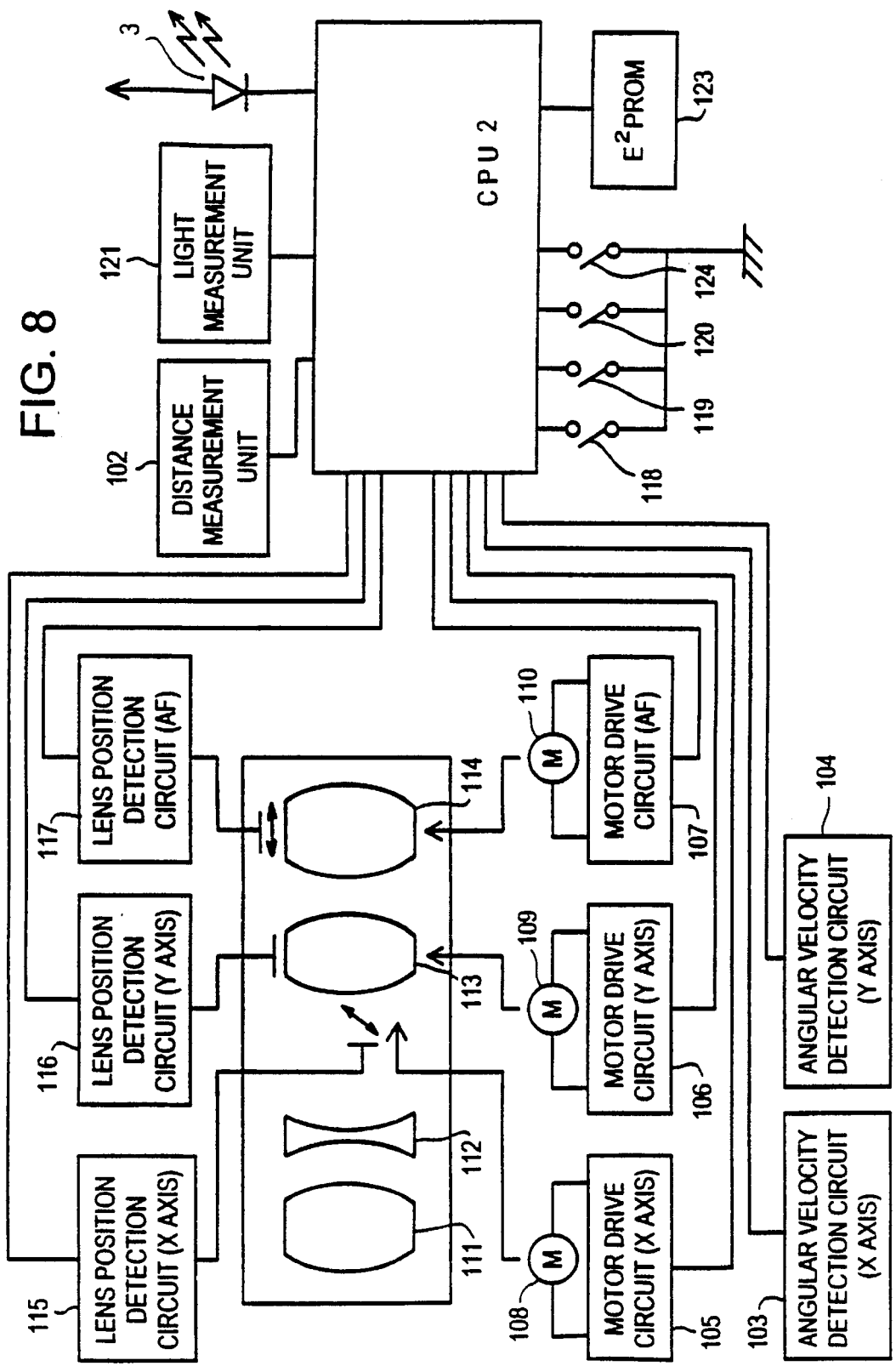
FIG. 8 is a block diagram of a camera in accordance with a second preferred embodiment of the present invention.

FIG. 8 is a block diagram of a camera control system in accordance with a second preferred embodiment of the present invention. The camera control system is equipped with a photographic optical system comprising a set of four lenses 111, 112, 113, and 114. The lens 113 (called "vibration compensation lens 113") is capable of being driven in the X axis direction (the long direction of the camera), and in the Y axis direction (the short direction of the camera) to compensate for vibrations.

A CPU 2 comprises a one chip microcomputer which controls all functions of the camera. Within the CPU 2 is a counter unit, a clock timer to measure time, and an A/D conversion unit.

The camera is provided with a distance measurement unit 6 for measuring the distance to the subject, a light measurement unit 7 for measuring the light in the subject field, and a display unit 3 for displaying the vibration status. A main switch 118 is provided to initiate the operation of the camera and comprises a status switch which has an ON and OFF position. The main switch 118 maintains the ON position until it is returned to the OFF position. A switch 119 initiates preparations for photography when the shutter release button is pressed down halfway. A switch 120 goes ON when the shutter release button is fully pressed. A switch 124 is provided to disable vibration compensation control. An $E^2$ PROM 123 is a read and write capable, non-volatile memory attached to the CPU 1.

An angular velocity detection circuit 103 detects the angular velocity (i.e. vibration), of the camera in the X axis direction, taking the Y axis to be the center of the motion. An angular velocity detection circuit 104 detects the angular velocity of the camera in the Y axis direction, taking the X axis to be the center of motion. The angular velocity detection circuits 103 and 104 output different values based on the angular velocity produced by camera vibration. The CPU 2 detects the angular velocity of the vibration by passing the output of the angular velocity detection circuits 103 and 104 through an A/D conversion.

A motor drive circuit 105 duty-drives a motor 108 to drive the vibration compensation lens 113 in the X axis direction. Similarly, a motor drive circuit 106 duty-drives a motor 109 to drive the vibration compensation lens 113 in the Y axis direction. A motor drive circuit 107 controls a motor 110 to drive the lens 114, which is a focusing lens.

A lens position detection circuit 115 detects the position (as determined from the amount of movement) of the vibration compensation lens 113 on the X axis. Similarly, a lens position detection circuit 116 detects the position of the vibration compensation lens 113 on the Y axis. A lens position detection circuit 117 detects the position of focusing lens 14 on the optical axis.

The CPU 2 controls the motors 108 and 109 by outputting a drive direction signal to the motor drive circuits 105 and 106. Moreover, the CPU 2 controls the velocity of the motors 108 and 109 by outputting a drive duty signal to the motor drive circuit 105 and 106. The motor drive circuits 105 and 106 control the vibration compensation lens 113 at the specified velocity by supplying motors 108 and 109 with electricity at the specified duty in the specified direction. The rotation of the motors 108 and 109 are converted to linear motion by a pair of correction lens drive mechanism systems (not shown) to drive the vibration compensation lens 113 in the X axis and the Y axis direction.

The CPU 2 analyzes the distance measurement data obtained by the distance measurement circuit 102 and drives the motor drive circuit 107 in accordance with the results. The motor drive circuit 107 drives the lens 114 at specified velocity by supplying a motor 110 with electricity in the direction specified by the CPU 2. The rotation of the motor 110 is converted to linear motion by a focusing lens drives mechanism system (not shown), and drives the lens 114 along the optical axis.

A lens position detection circuit 115 outputs pulses indicating the amount of movement of the vibration compensation lens 113 along the X axis. Similarly, a lens position detection circuit 116 outputs pulses indicating the amount of movement of the vibration compensation lens 113 along the Y axis. The CPU 2 determines the position of the vibration compensation lens 13 on the X axis and the Y axis, along with the amount of movement, by counting the number of the pulses. The CPU 2 computes the velocity of the vibration compensation lens 13 on the X axis and the Y axis by detecting the amount of movement over a fixed period of time. A lens position detection circuit 117 outputs pulses indicating the amount of movement along the optical axis of the lens 114. The CPU 2 determines the amount of movement of the lens 114 by counting the number of pulses output by the lens position detection circuit 117.

The $E^2$ PROM 123 stores data required for photographic processing. When necessary, to execute a specified sequence, the CPU 1 reads data from the $E^2$ PROM 123.

Moreover, in accordance with the second preferred embodiment, the distance measurement unit 6 takes 0–300 ms to execute a distance measuring operation, the light measurement unit 7 takes approximately 50 ms to perform a light measuring operation, and the focusing lens 14 takes approximately 100 ms to be driven to focus. The circuit stability time of angular velocity detection circuits 103 and 104 is approximately 300 ms, the shock avoidance time during release is approximately 50 ms, the zero angular velocity detection time is approximately 900 ms; and the vibration compensation control time required to achieve stability is approximately 20 ms.

Figure 9:
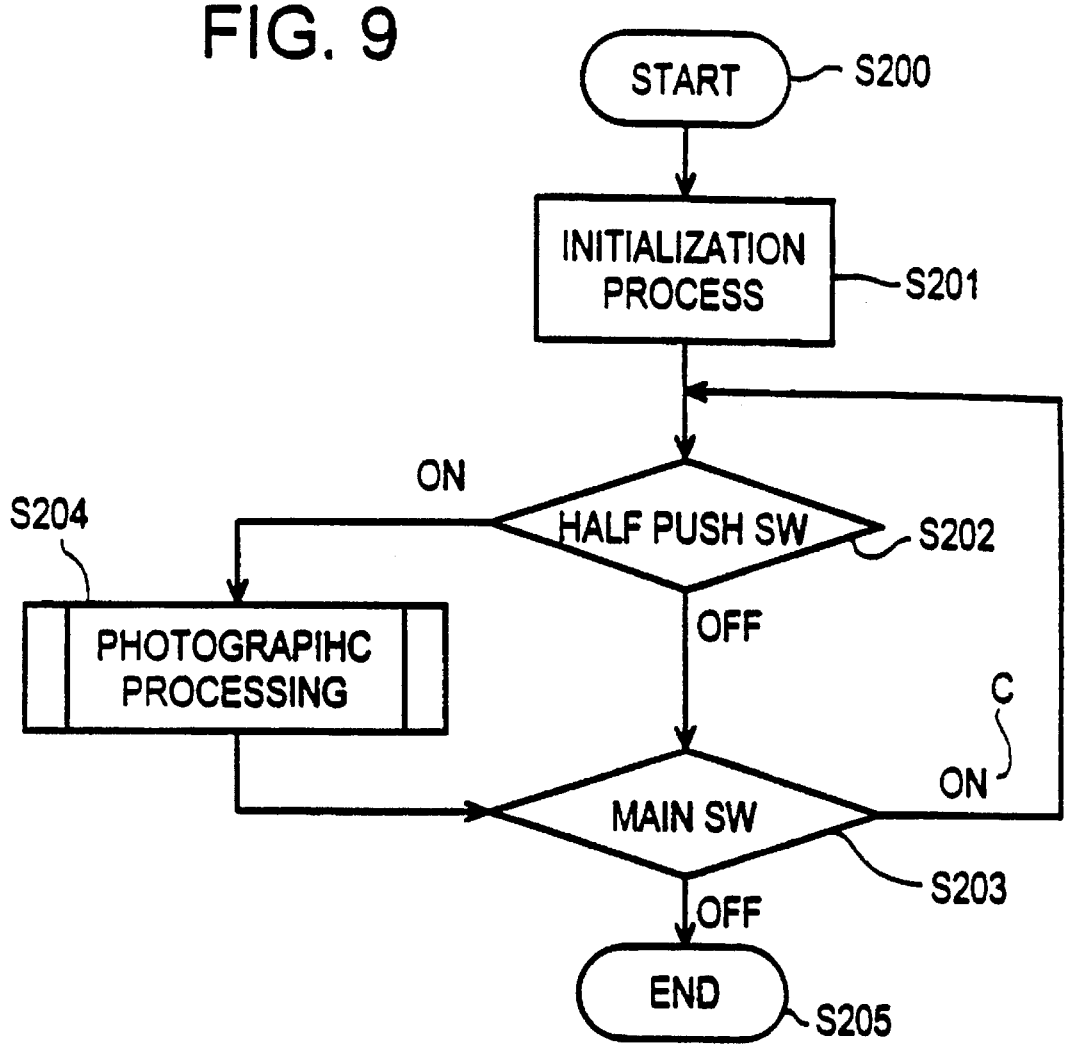
FIG. 9 is a flow chart showing the operation of the camera in accordance with a second preferred embodiment of the present invention.
Figure 10:
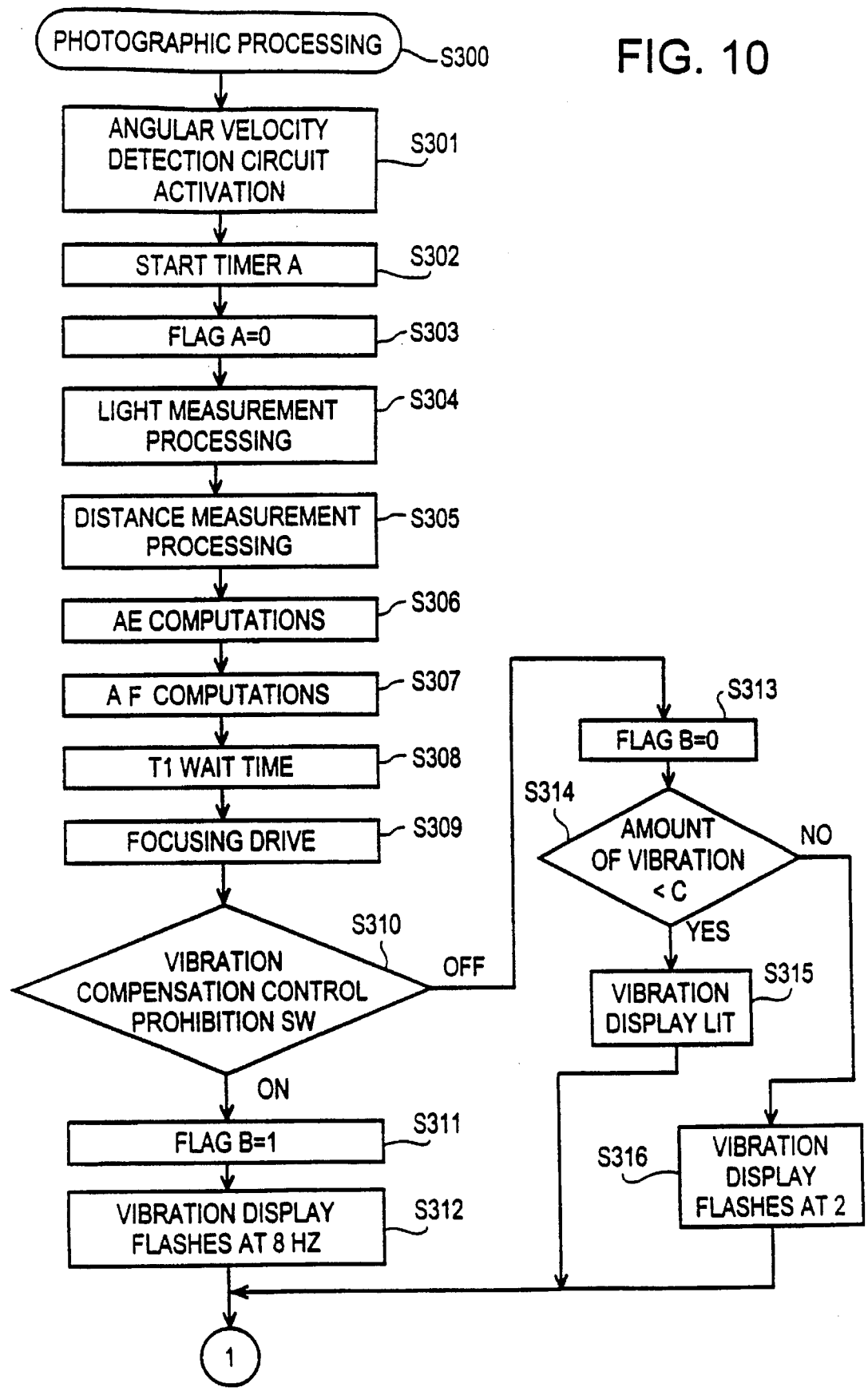
FIG. 10 is a flow chart showing the operation of the camera in accordance with the second preferred embodiment of the present invention.
Figure 11:
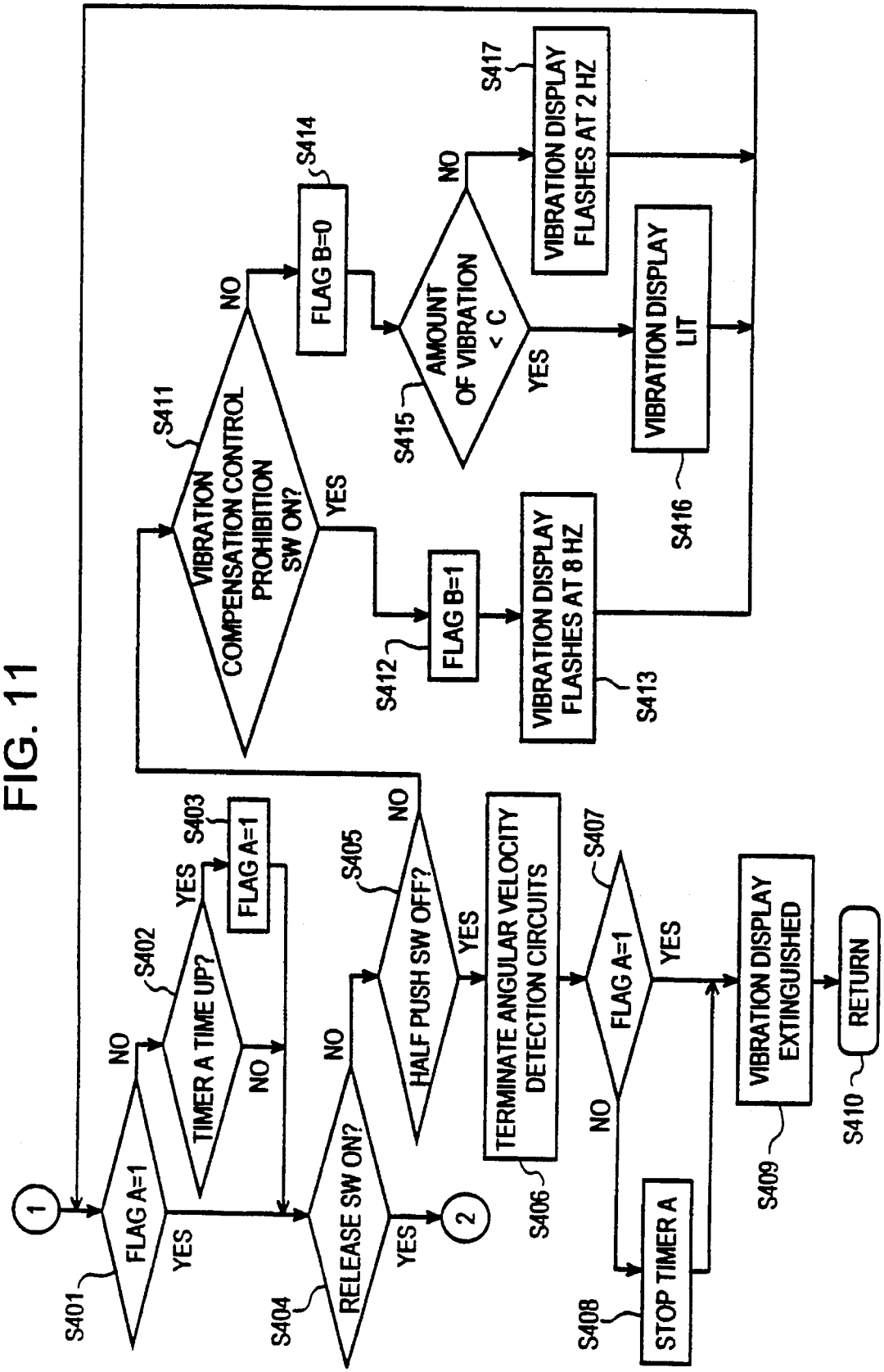
FIG. 11 is a continuation of the flow chart in FIG. 10 showing the operation of the camera in accordance with a second preferred embodiment of the present invention.
Figure 12:
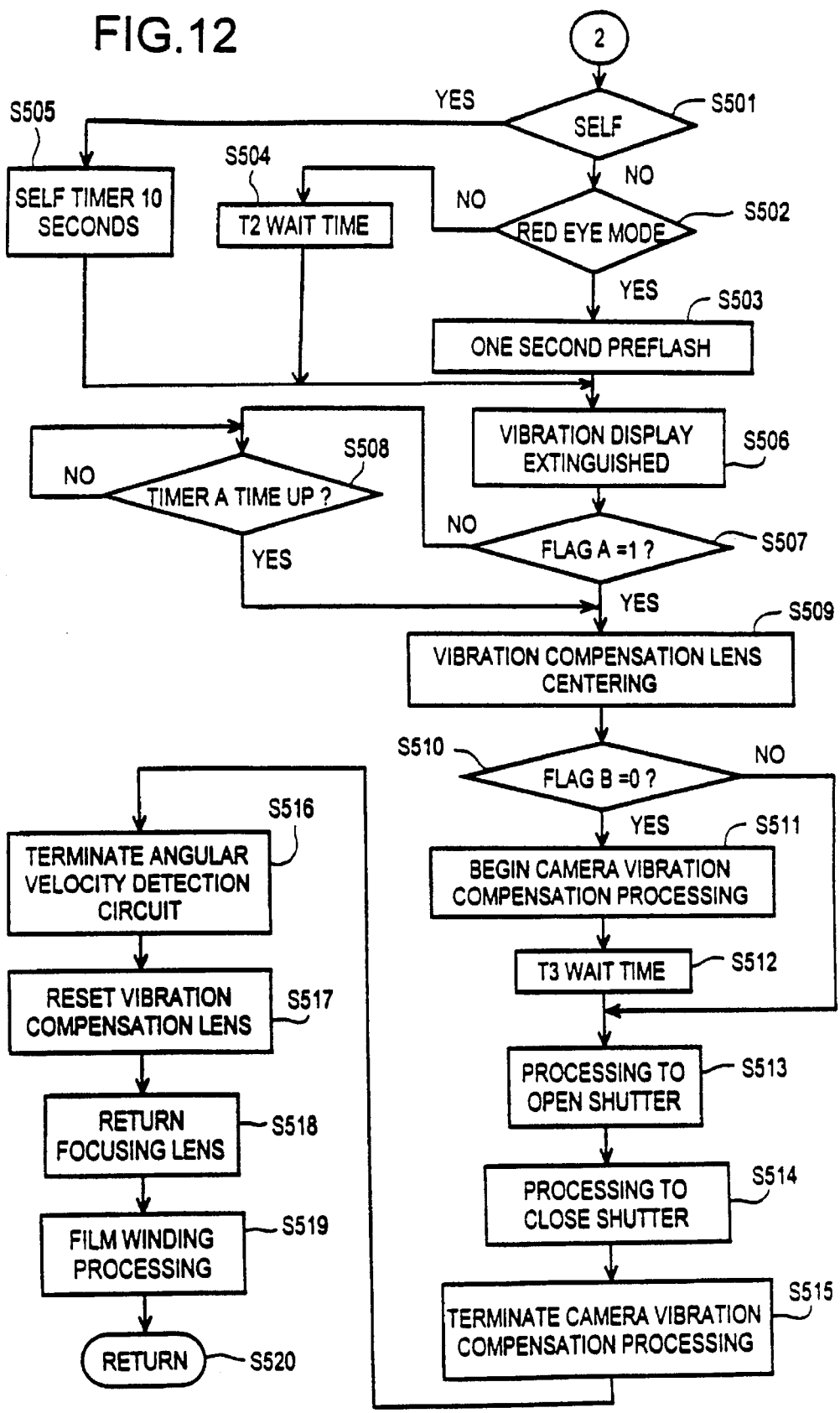
FIG. 12 is a continuation of the flow chart in FIG. 11 showing the operation of a camera in accordance with a second preferred embodiment of the present invention.

FIG. 9 is a flow chart showing the main operation of a camera according to the second preferred embodiment of the present invention. At step S200 the power source has been turned ON, and processing can begin. First, in step S201, the CPU 1 is initialized. Next the operation circulates in a loop from S202 to S203. During the loop, the camera waits for the switch 119 to go ON signaling the half push of the shutter release button in step S202, or for the main switch 118 to go OFF in step S203. If the main switch 118 goes OFF at step S203, the operation advances to step S205 and processing is concluded. Thereafter, the camera waits for the main switch 118 to go 0N again, and processing begins at step S200. If the switch 119 is turned ON, the operation advances to step S204, and a photographic processing sub-routine is called. FIG. 10, FIG. 11, and FIG. 12 are flow charts detailing the photographic processing sub-routine according to the second preferred embodiment of the present invention.

The photographic processing sub-routine begins from step S300 in FIG. 10. First, the angular velocity detection circuit 103 and angular velocity detection circuit 104 are activated in step S301. The angular velocity detection circuit 103 and angular velocity detection circuit 104 continuously operate until they are shut down in step S516.

In step S302 a timer A (the angular velocity zero detection time is 900 ms in this embodiment) is started, and thereafter a flag A is set to zero at Step S303. Thereafter, a light measurement processing is conducted during step S304, and a distance measurement process is executed during step S305.

Next, in step S306 AE (automatic exposure) computations are performed on the results of the light measurement processing performed in step S304. In step S307 AF (automatic focusing) computations are performed using the results of the distance measurement process carried out in step S305. Next, in step S308, the operation waits for a time of T1, and afterwards the operation advances to step S309. The wait time of T1 is required to provide time for the angular velocity detection circuits S103 and 104 to stabilize. In the second preferred embodiment, T1 is approximately 250 ms, derived by subtracting the distance measurement time (0–300 ms) and the light measurement time 50 ms from the angular velocity detection circuit stability time (300 ms). In step S309, the lens 114 is driven to a specified point obtained from the distance measurement value that was, determined in step S305.

In step S310, it is determined whether the switch 124 is ON. If the switch 124 is ON the operation advances to step S311, and a flag B is set to "1". Thereafter, the display unit 3 is driven to flash at 8 Hz in Step S312. The, 8 Hz flashing indicates that vibration compensation will not be performed. Thereafter, the operation advances to S401 in FIG. 11.

If, in step S310, the switch 124 is OFF, the flag B is set to zero in step S313. Then, in step S314 it is determined whether the outputs from the angular velocity detection circuits 103 and 104, indicating the amount of vibration, are smaller than a specified value C. If the amount of vibration is smaller than the specified value C, the display of the display unit 3 is steadily lit in step S315, and the operation advances to step S401 in FIG. 11. The steadily lit display indicates that the amount of vibration detected is in a correctable range.

If it is determined that the amount of vibration is larger than the specified value C, then in step S316 the display of the display unit 3 is controlled to flash at 2 Hz, and the operation advances to step S401 in FIG. 4. The 2 Hz flashing display indicates that the amount of vibration detected is large, and it is not known whether vibration compensation can correct for image blur.

The status of flag A, which was previously set in step S303, is checked in step S401 (FIG. 4) and if flag A is 0, the operation advances to step S402, otherwise the operation advances to step S404.

In step S402 the timer A (the zero angular velocity detection time =900 ms) is checked, and if it has elapsed, the flag A is set to "1" in step S403 and operation advances to step S404. If the timer A has not elapsed the operation proceeds directly to step S404.

In step S404 it is determined whether the switch 120 is ON, in which case the operation advances to S50.1 in FIG. 5. If the switch 120 is OFF, the operation advances to step S405 and the switch 119 is checked to be sure that it is still ON via a half push of the shutter release button.

If it is determined that the switch 119 is OFF in step S405, the operation of the angular velocity detection circuits 103 and 104 is terminated in step S406. Afterwards, the flag A is checked in step S407. If flag A is set to "1", the operation advances to S409, and if flag A is set to "0", timer A is stopped in step S408, and the operation advances to S409. The display of the display unit 3 is extinguished in step S409, and the operation returns to the main loop in FIG. 9 at step S410. In this instance, photography is not carried out.

If in step S405 the switch 119 is ON, it is then determined in step S411 whether the switch 124 is ON, i.e. the user does not desire vibration compensation system, and a flag B is set to "1" in step S412, and in step S413 the display unit 3 is controlled to flash at 8 Hz, and the operation returns to step S401.

If in step S411 the switch 124 is OFF, i.e. the photographer desires vibration compensation, the flag B is set to "0" in step S414. Thereafter, it is determined in step S415, whether the outputs from the angular velocity detection circuits 103 and 104, are larger than the specified value C and if so, the display of vibration display device 122 is controlled to be steadily lit in step S416, and the operation returns to S401.

If it is determined in step S415 that the amount of vibration is larger than the specified value C, then in step S417, the display of vibration display device 122 is controlled to flash at 2 Hz, and the operation returns to step S401.

In step S501 (FIG. 12), it is determined whether the camera is in a self-mode, and if so, a self timer time (for example 10 seconds) is waited during step S505, and afterwards the operation advances to step S506.

If the camera is not in the self-mode, it is determined whether the camera is in a red-eye mode in the following step S502. If the camera is in the red-eye mode, after a preflash is executed for one second in step S503, and the operation advances to step S506. If the camera is in the red-eye mode in step S502, after waiting a wait time T2 (preferably 50 ms) in step S504, and the operation advances to step S506.

In step S506, the display of the display unit 3 is extinguished, and the operation advances to step S507.

In step S507, the status of flag A is checked, and flag A is set to "1", the operation advances to step S509. If flag A is set to "0" in step S507, the operation advances to step S508 and the camera waits until the timer A, that was started at step S302, has expired, and thereafter, the operation advances to step S509.

In step S509, the vibration compensation lens 13 is moved to the central position on the optical axis. Afterwards in step S510, the status of, a flag B is checked. If the flag B is set to "1", vibration compensation control is to be disabled and the operation advances to step S513.

If the flag B is set to "0", vibration compensation control is executed, and a vibration compensation processing is initiated in the following step S511. After the vibration compensation processing has been initiated, the system waits for a time T3 (this is the time required to achieve vibration compensation control stability, preferably 20 ms) in step S512, and afterwards the operation advances to step S513.

In step S513 the shutter begins to open. If vibration compensation processing was enabled, it continues from step S511, before the shutter begins to open, until step S515, after the shutter has closed. In step S513, the shutter is opened for a specified time in accordance with the AE computed value that was derived in step S306. Afterwards, the shutter is closed in step S514, and the vibration compensation processing is thereafter terminated in step S515. Next, in step S516, the operation of the angular velocity detection circuits 103 and 104 is terminated. The vibration compensation lens 113 is returned to an initial position in step S517, and the lens 114 is driven to a specified reset position in step S518. Next, the film is wound in step S519 and the operation returns in step S520 to the main loop in FIG. 9.

The angular velocity detection circuits 103 and 104, activated in step S301, continue to operate until they are terminated in step S516, and do not stop even if vibration compensation control is disabled. For this reason, the circuit stability times for the angular velocity detection circuit 103 and angular velocity detection circuit 104 need not be taken individually. Consequently, even if vibration compensation has been disabled, vibration compensation can be immediately implemented without waiting for the circuit stability times of the angular velocity detection circuits 103 and 104 if vibration compensation is enabled.

Although the second embodiment of the present invention has been described with respect to a specific configuration, it will be recognized that the second embodiment is not limited to the specific configuration. For example, a touch sensor which detects that the camera has been touched by a part of the photographer's body or a proximity detection switch which detects that the photographer has approached the camera, or a sensor which detects the line of sight of the photographer may be used as to begin preparations for photography.

Figure 13:
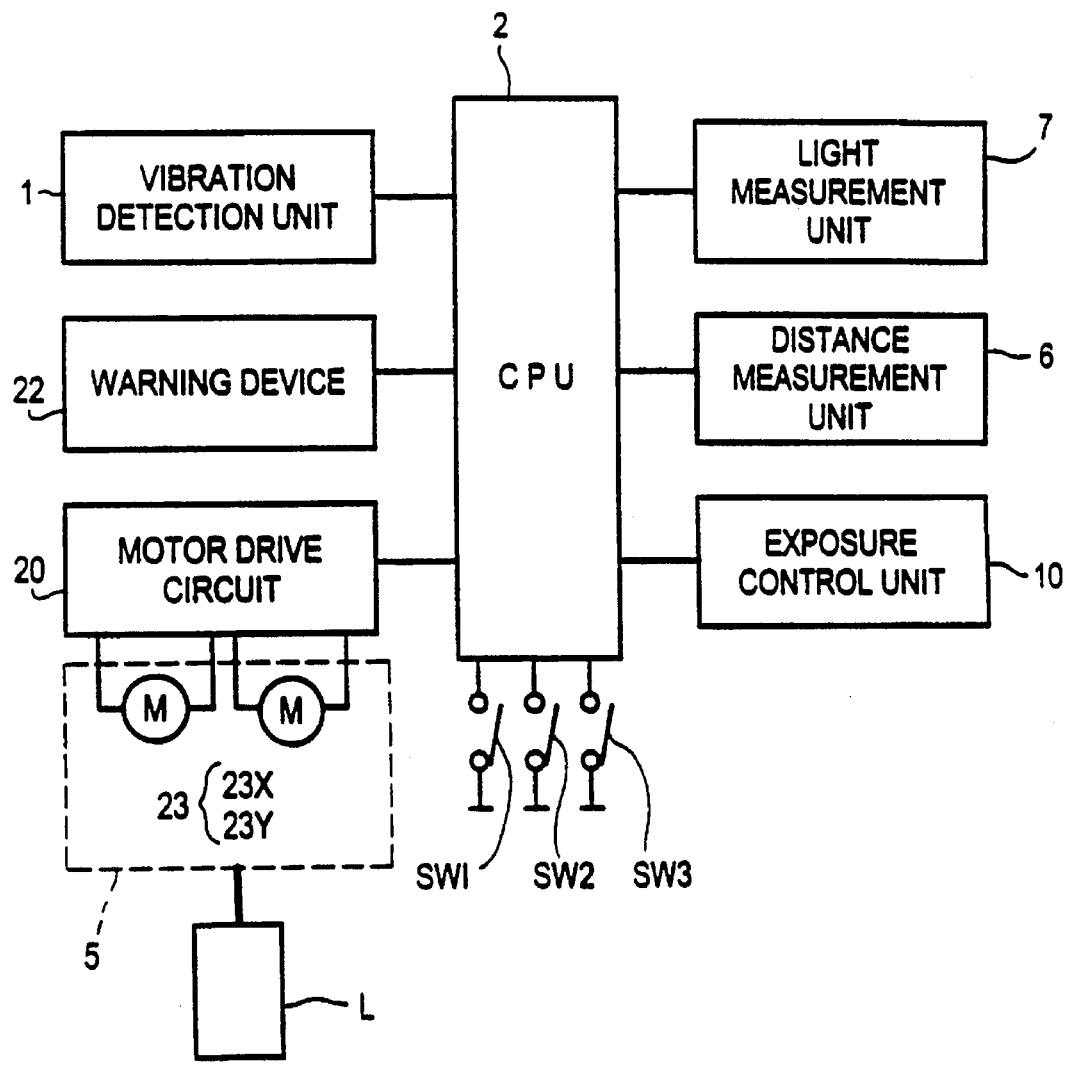
FIG. 13 is a block diagram of a camera in accordance with a third preferred embodiment of the present invention.
Figure 14:
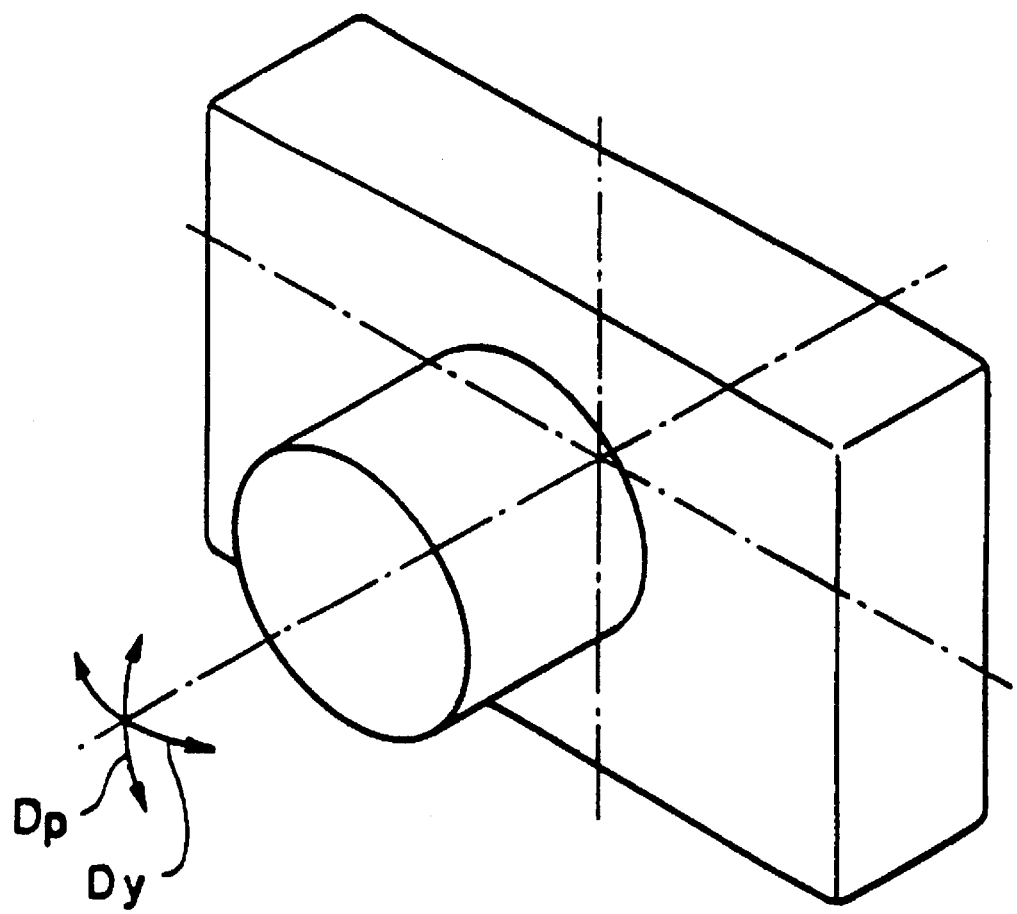
FIG. 14 is perspective view of a camera showing the direction of pitch and yaw with respect to the camera in accordance with the third preferred embodiment of the present invention.

FIG. 13 is a block diagram showing the control system of a camera in accordance with a third preferred embodiment of the present invention. A vibration compensation control system is provided that generally comprises a vibration detection unit 1, a motor drive circuit 20 for driving a vibration compensation motor 23, a warning device 22, a mode selection switch SW1, and a CPU 2. The vibration detection unit 1 comprises, for example, a pair of angular velocity sensors which detect the amount of camera vibration in the yaw Dy and pitch Dp directions of the camera, as shown in FIG. 14.

The drive system 5 shifts a vibration compensation lens L, which is part of a photographic lens system, in a direction perpendicular to the optical axis. The drive system 5 generally comprises a vibration compensation motor 23, which comprises an X direction motor 23x and a Y direction motor 23y. The rotation of the X direction motor 23x is transmitted to the vibration compensation lens L through an X direct power transmission mechanism (not shown) which shifts the vibration compensation lens L in the left and right directions. The rotation of the Y direction motor 23y is transmitted to the vibration compensation lens L through a Y direction power transmission mechanism (not shown) which shifts the vibration compensation lens L in the up and down directions.

The mode selection switch SW1 selects either a vibration compensation photographic mode, which conducts photography while the vibration compensation lens L is shifted in the direction perpendicular to the optical axis by the 5, or an ordinary photographic mode in which photography is conducted without shifting the vibration compensation lens L.

The warning device 22 informs the photographer that the drive 5 is active when the vibration compensation photographic mode is set. The warning device 5 comprises, for example, an LED situated within the finder.

A light measurement unit 7, also connected to the CPU 2, detects the subject brightness. A distance measurement unit 6 is provided to detect the distance to the subject. An exposure control unit 10 drives the combined shutter and aperture (not shown). A switch SW2, goes on by the operation of pressing the shutter release button (not shown) half way, and a switch SW3 goes on when the shutter release button is fully pressed.

Figure 15:
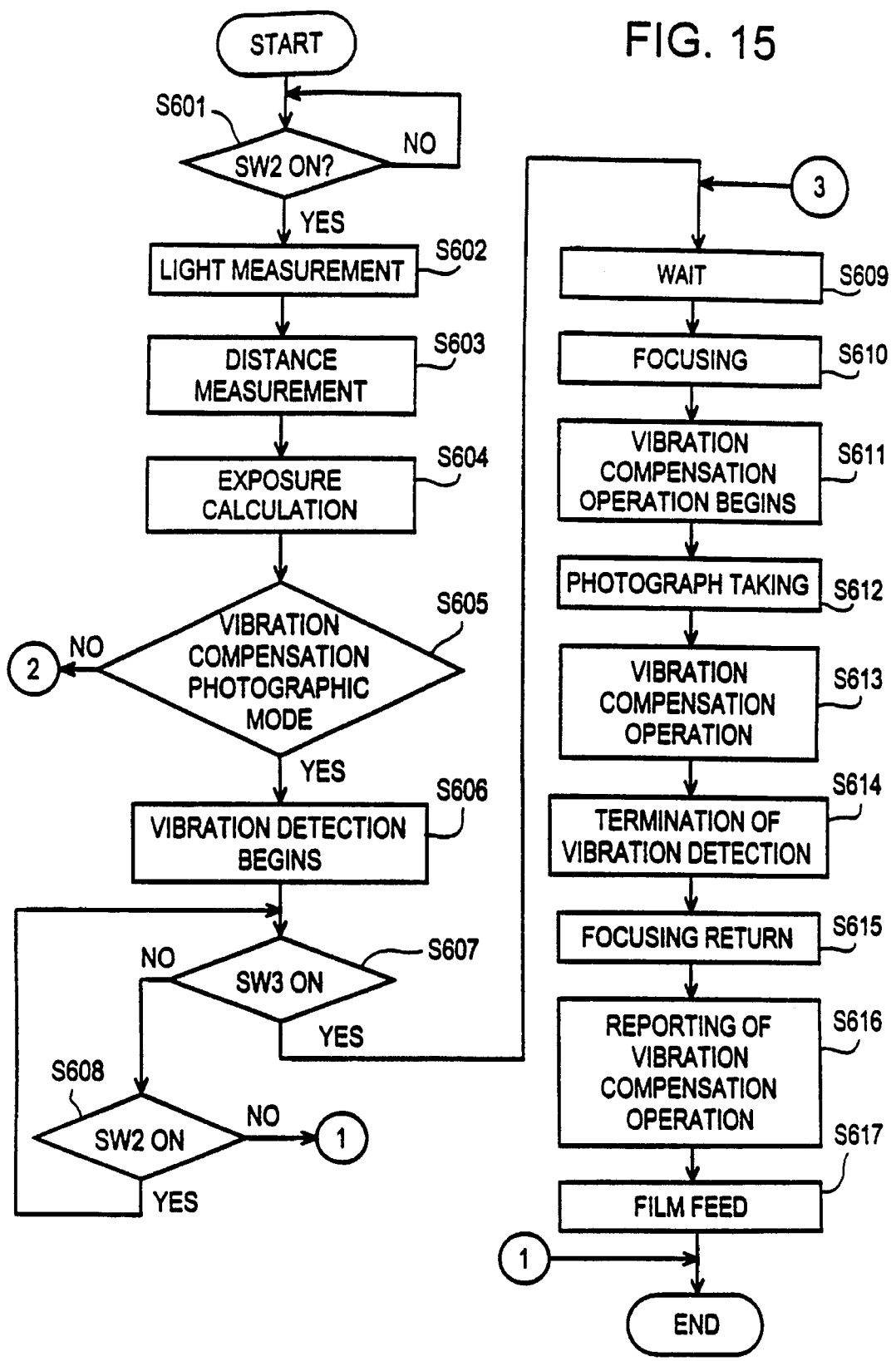
FIG. 15 is a flow chart of the operation of the camera in accordance with the third preferred embodiment of the present invention.
Figure 16:
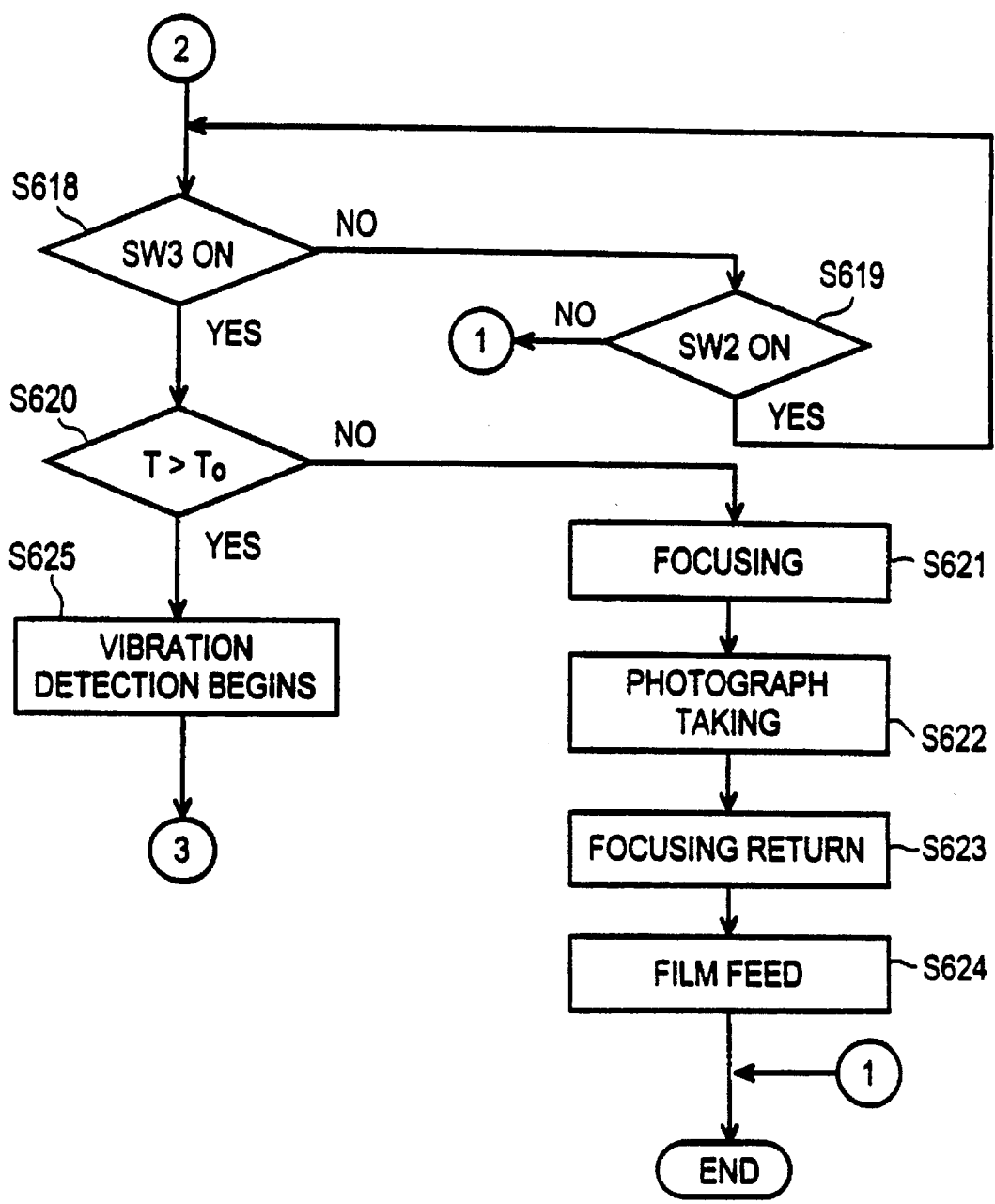
FIG. 16 is a continuation of the flow chart in FIG. 16 showing the operation of a camera in accordance with the third preferred embodiment of the present invention.

FIGS. 15 and 16 are flow charts showing the operation of the CPU 2. First, in step S601, operations wait until the switch SW2 goes ON, thereafter the operation advances to step S602. In step S602, the light measurement unit 7 is activated, and the subject brightness is detected. In step S603, the distance measurement unit 6 is activated, and the distance to the subject is detected. In step S604, the exposure is calculated based on the film ISO sensitivity, as detected by the sensitivity detection circuit (not shown), and the shutter time and aperture value previously calculated.

Next, in step S605 it is determined whether the vibration compensation photographic mode has been selected, in which case the operation advances to step S606 and the vibration detection unit is activated to begin vibration detection. Thereafter, in step S607 it is determined whether the switch SW3 is ON, in which case the operation advances to step S608 and it is determined whether the switch SW2 is ON. If the switch SW2 is OFF, processing is terminated, and if the switch SW2 is ON, the operation returns to step S7.

When, it is determined that the switch SW3 is ON in step S607, the operation advances to step S609, and a fixed amount of time is waited. Thereafter in step S610, focusing is conducted. Specifically, the focusing optical system (not shown) of the photographic lens is driven parallel to the optical axis an amount based on the subject distance that was detected in step S603, and the subject is brought in to focus. Next, in step S611, vibration compensation operations are begun using the drive 5. Specifically, the vibration compensation motor 23 is driven based on the output of the vibration detection unit 1, and the vibration compensation lens L is shifted in a direction perpendicular to the optical axis.

Next, in step S612, the exposure control unit 10 is activated, and photography is conducted by driving the shutter and the aperture based on the aperture value and the shutter time calculated in step S604. In addition, while the shutter is being released, the vibration compensation lens L is shifted based on the detection of vibration by vibration detection unit 1.

When the shutter release has been completed, activation of the drive 5 is terminated in step S613 and the detection of vibration by the vibration detection unit 1 is terminated in step S614. In step S615, the focusing optical system of the photographic lens is returned to a reset position, and thereafter in step S616, the warning device 22 is activated to indicate that the vibration compensation operation is active. In step S617, the film is wound one frame by activating a film feed circuit (not shown) and processing is completed.

Meanwhile, if the vibration compensation photographic mode is not set in step S605, the same processing, as in steps S607 and S608, is executed from steps S618 to S619 (FIG. 15). When it is determined that the switch SW3 is ON in step S618, the operation advances to step S620, and it is determined whether a shutter time T calculated in step S602 is longer than a specified time $T_0$.

If the shutter time T is equal to or less than the specified time $T_0$ focusing is executed in step S621, and the shutter is released in step S622. Thereafter, the focusing lens is returned to the reset position in step S623, and one frame of film is wound in step S624. In this instance, the vibration compensation operation is not executed.

On the other hand, if the shutter time T is longer than the specified time $T_0$ in step S620, vibration detection by the vibration detection unit 1 is begun in step S625. Thereafter, the operation advances to step S609 (FIG. 15), and photography continues as before.

Thus, if shutter time T is longer than the specified time $T_0$, it is determined that the photographic conditions exceed the permissible value for the amount of vibration, and even if the ordinary photographic mode is selected, photography is executed by shifting the vibration compensation lens L in a direction perpendicular with the optical axis by using the drive unit 5. Consequently, even if the photographer cannot decide whether the photographic conditions will generate image blur, or if the photographer forgets to switch from the ordinary photographic mode to the vibration compensation photographic mode, the generation of unwanted image blur can be prevented.

Although the third preferred embodiment of the present invention has been has been described with respect to a specific configuration, it will be recognized that the third embodiment is not limited to the specific configuration. For example, in the third embodiment, the photographic conditions are determined to exceed the permissible value for the amount of image blur because the shutter time T is longer than the specific time $T_0$, but when, for example, the camera is provided with a zoom lens, it may be determined that the conditions exceed the permissible value for the amount of image blur when the focal point of the photographic lens (as determined by a known "zoom encoder") is longer than the stipulated distance. Also, because blur of the photographic image caused by camera vibrations are more noticeable with closer photographic distances, it may be determined that the conditions exceed the permissible value for the amount of image blur when the photographic distance is shorter than specified distance. Thus, according to the third embodiment of the present invention, because the drive unit 5 is activated during photography, even when ordinary photographic mode is selected, if it is determined that the photographic conditions exceed the permissible value for the amount of blur of the photographic image, it is possible to prevent the generation of undesirable image blur even if the photographer cannot precisely determine whether the photographic conditions would create unpermissible blur, or even when the photographer forgets to switch from the ordinary photographic mode to the vibration compensation photographic mode.

Although a few preferred embodiments of the present invention have been shown and described, it would be, appreciated by those skilled in the art that changes may be made in these embodiments without departing from the principles and spirit of the invention, the scope of which is defined in the claims and their equivalents.

What is claimed is:

1. An image producing apparatus comprising:
    a vibration detection unit to detect vibrations in the image producing apparatus;
    a vibration compensation unit to correct for the effects of the vibrations detected by the vibration detection unit on the image;
    a mode selection unit to selectively disable the vibration compensation unit in response to input from a user of the image producing apparatus; and
    said vibration detection unit continues to detect vibration when the mode selection unit disables the vibration compensation unit.

2. An image producing apparatus, as set forth in claim 1, wherein said mode selection unit is a switch.

3. An image producing apparatus, as set forth in claim 1, further comprising:
    a display unit to indicate to the user that the vibration compensation unit has been disabled.

4. An image producing apparatus, as set forth in claim 3, wherein said display unit is located inside a view finder through which the user looks when producing the image.

5. An image producing apparatus, as set forth in claim 3, wherein said display unit is located on the outside of the image producing apparatus.

6. An image producing apparatus, as set forth in claim 3, further comprising:

a display unit to indicate to the user that said vibration detection unit has detected vibrations.

7. An image producing apparatus, as set forth in claim 3, wherein said display unit displays an indication to the user that said vibration detection unit has detected vibrations which can be compensated for by said vibration compensation unit.

8. An image producing apparatus, as set forth in claim 3, wherein said display unit displays an indication to the user that said vibration detection unit has detected vibration which said can not be compensated for by said vibration compensation unit.

9. An image producing apparatus, as set forth in claim 3, wherein said display unit displays no indications when the image producing apparatus is producing the image.

10. An image producing apparatus, as set forth in claim 3, wherein:
    said display unit displays a steady indication to the user when said vibration detection unit detects vibrations which can be compensated for by said vibration compensation unit;
    said display unit displays a flashing indication having a first frequency to the user when said vibration detection unit detects vibrations which cannot be compensated for by said vibration compensation unit; and
    said display unit displays a flashing indication having a second frequency to the user when the vibration compensation unit has been disabled.

11. An image producing apparatus, as set forth in claim 3, wherein said mode selection unit is a contact switch that maintains an ON state as long as the contact switch is pressed by the user.

12. An image producing apparatus, as set forth in claim 10, wherein said display unit displays the indication that said vibration detection unit has been disabled even if said vibration detection unit detects vibrations.

13. An image producing apparatus, as set forth in claim 1, further comprising:
    a control unit which enables said vibration compensation unit even if the vibration compensation unit has been disabled by the mode selection unit if said vibration detection unit detects an unpermissible amount of vibration.

14. An image producing apparatus, as set forth in claim 1, further comprising:
    a control unit which enables said vibration compensation unit even if the vibration compensation unit has been disabled by the mode selection unit if the amount of time required to produce the image is more than a permissible amount.

15. An image producing apparatus, as set forth in claim 1, wherein said mode selection unit disables said vibration compensation unit by intercepting a signal produced by said vibration detection unit indicating vibration in the image producing apparatus.

16. An image producing apparatus, as set forth in claim 1, further comprising:
    a control unit which outputs an initialization signal which causes said vibration compensation unit to be disabled for a period of time.

17. An image producing apparatus, as set forth in claim 16, wherein said control unit outputs the initialization signal in response to a half push of a release button.

18. An image producing apparatus, as set forth in claim 16, wherein said control unit outputs the initialization signal in response to a user touching said image producing apparatus.

19. An image producing apparatus, as set forth in claim 16, wherein said control unit outputs the initialization signal in response to a user being in close proximity to said image producing apparatus.

20. An image producing apparatus, as set forth in claim 16, wherein said control unit outputs the initialization signal in response to a user looking through a viewfinder.

21. An image producing apparatus, as set forth in claim 16, wherein said control unit outputs the initialization signal in response to a full push of a release button.

22. A camera for producing an image comprising:

a vibration detection unit to detect vibrations in the camera;

a vibration compensation unit to correct for the effects of the vibrations detected by the vibration detection unit on the image;

a switch to selectively disable the vibration compensation unit in response to input from a user of the camera, said vibration detection unit continues to detect vibration when the switch disables the vibration compensation unit; and a display unit which illuminates a display to indicate to a user that the vibration detection unit has been disabled.

23. A camera, as set forth in claim 22, wherein said switch is located on the front surface of the camera.

24. A camera, as set forth in claim 22, wherein said display unit is located inside a view finder through which a user of the camera looks when producing the image.

25. A camera, as set forth in claim 22, wherein said display unit is located on the outside of the camera.

26. An image producing apparatus, as set forth in claim 22, further comprising:

a display unit to indicate to the user that said vibration detection unit has detected vibrations.

27. A camera, as set forth in claim 22, wherein said display unit displays an indication to the user that said vibration detection unit has detected vibrations which can be compensated for by said vibration compensation unit.

28. A camera, as set forth in claim 22, wherein said display unit displays an indication to the user that said vibration detection unit has detected vibrations which said can not be compensated for by said vibration compensation unit.

29. A camera, as set forth in claim 22, wherein said display unit displays no indications when the camera is exposing the image.

30. A camera, as set forth in claim 22, wherein:

said display unit displays a steady indication to the user when said vibration detection unit detects vibrations which can be compensated for by said vibration compensation unit;

said display unit displays a flashing indication having a first frequency to the user when said vibration detection unit detects vibrations which cannot be compensated for by said vibration compensation unit; and said display unit displaying a flashing indication having a second frequency to the user when the vibration compensation unit has been disabled.

31. A camera, as set forth in claim 22, wherein said switch is a contact switch that maintains an ON state as long as the contact switch is pressed by the user.

32. A camera, as set forth in claim 30, wherein said display unit displays the indication that said vibration detection unit has been disabled even if said vibration detection unit detects vibrations.

33. A camera, as set forth in claim 22, further comprising:

a control unit which enables said vibration compensation unit even if the vibration compensation unit has been disabled by said switch if said vibration detection unit detects an unpermissible amount of vibration.

34. A camera, as set forth in claim 22, further comprising:

a control unit which enables said vibration compensation unit even if the vibration compensation unit has been disabled by said switch if the amount of time required to expose the image is more than a permissible amount.

35. A camera, as set forth in claim 22, wherein said switch disables said vibration compensation unit by intercepting a signal produced by said vibration detection unit indicating vibration in the image producing apparatus.

36. A camera, as set forth in claim 22, further comprising:

a control unit which outputs an initialization signal which causes said vibration compensation unit to be disabled for a period of time.

37. A camera, as set forth in claim 36, wherein said control unit outputs the initialization signal in response to a half push of the release button.

38. A camera, as set forth in claim 36, wherein said control unit outputs the initialization signal in response to a full push of the release button.

39. A camera, as set forth in claim 36, wherein said control unit outputs the initialization signal in response to a user touching said camera.

40. A method of producing an image with an image producing apparatus comprising:

determining whether a user desires to compensate for vibrations when producing the image;

detecting vibrations in the image producing apparatus, regardless of whether the user desires to compensate for vibrations;

producing the image with the image producing apparatus; and compensating for the detected vibration during the step of producing the image when it was determined that the user desired to compensate for vibrations.

41. A method as set forth in claim 40 further comprising:

displaying a first message to the user prior to producing the photograph when the user desires to produce an image without compensating for the vibrations.

42. A method as set forth in claim 41 further comprising:

displaying a second message to the user prior to producing the photographs when vibrations are detected which can be compensated for.

43. A method as set forth in claim 42, further comprising:

displaying a third message to the user prior to producing the photograph when vibrations are detected which cannot be compensated for.

44. A method as set forth in claim 42 further comprising:

compensating for the detected vibrations during the step of producing the image when it was determined that the user did not desire to compensate for vibrations and conditions are detected that would cause the image to be unacceptably blurred.

* * * * *

UNITED STATES PATENT AND TRADEMARK OFFICE
CERTIFICATE OF CORRECTION

PATENT NO. : 5,598,242

DATED : January 28, 1997

INVENTOR(S) : Junichi OMI, et al.

It is certified that error appears in the above-indentified patent and that said Letters Patent is hereby corrected as shown below:

Column 18, line 58, change "42" to -- 40 --.

Signed and Sealed this

Twenty-ninth Day of April, 1997

Attest:

BRUCE LEHMAN

*Attesting Officer*    *Commissioner of Patents and Trademarks*